United States Patent Office 3,097,011
Patented July 9, 1963

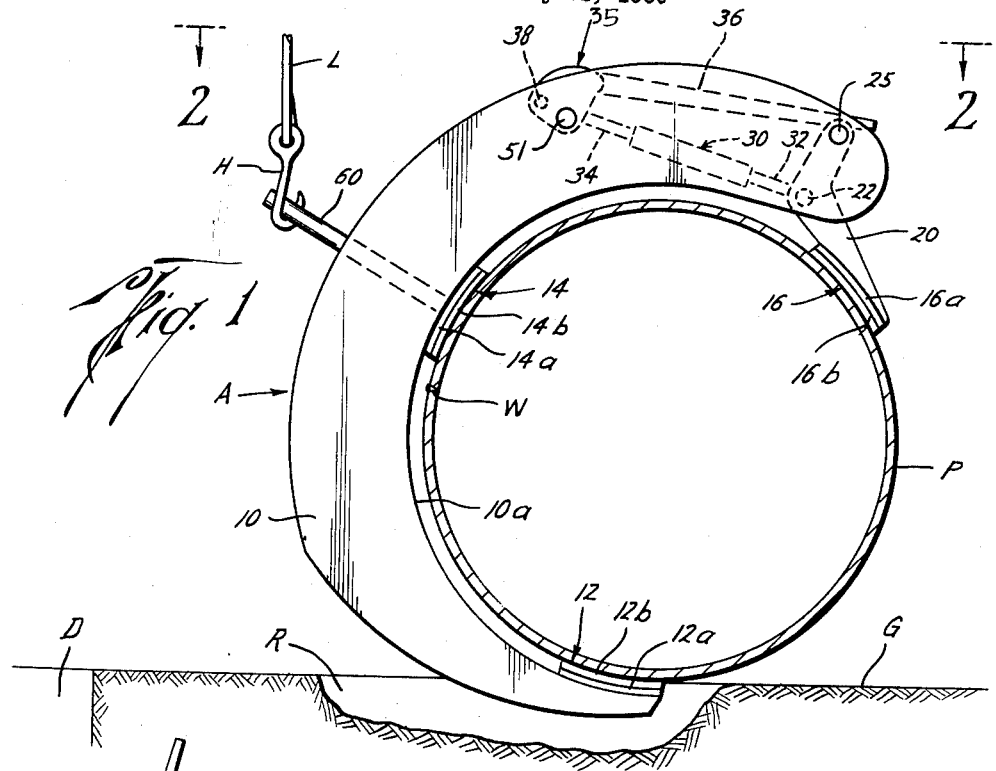
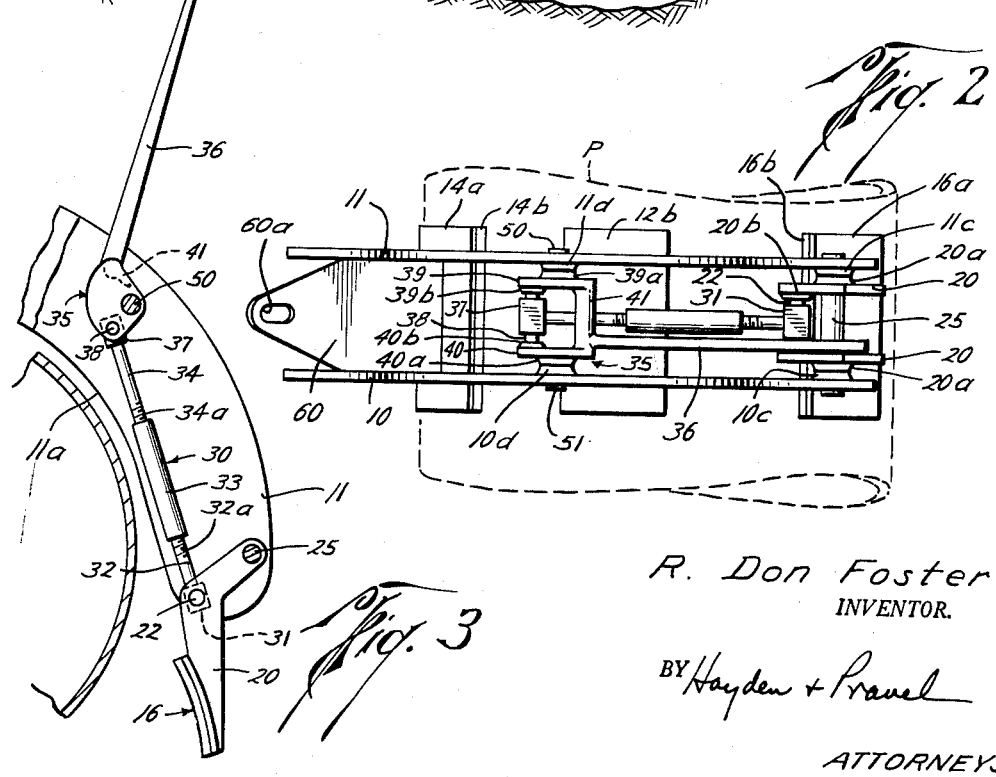

3,097,011
PIPE TONGS
Robert Don Foster, 3115 Buffalo Drive, Houston, Tex.
Filed May 31, 1960, Ser. No. 32,680
3 Claims. (Cl. 294—104)

This invention relates to new and useful improvements in pipe tongs.

In the laying of pipelines the pipe sections which ultimately make up the pipeline must be lifted and otherwise handled during various stages of the operation. The external surface of the pipe is generally coated with tar, asphalt or a similar material to provide a relatively thin coating which is desirable to protect the pipe from corrosion but which is subject to being scrapped or otherwise removed from the pipe if the pipe is engaged by sharp surfaces. Since the coating on the pipe must be as complete as possible in order to obtain maximum effectiveness, any damaged areas of the pipe are spot coated prior to placing them in the ditch or other location for use. Such spot coating is slow and expensive. Therefore, it is important to be able to lift and otherwise handle the pipe without damaging the coating on the pipe.

Generally, after the pipe has been coated, the coated pipe sections are welded together to form the pipeline, and in order to prevent or reduce the danger of a rupture in the weld seam of one pipe section from traveling to the weld seam of a pipe section adjacent thereto, the weld seams of adjacent pipes or pipe sections are normally offset or staggered with respect to each other. Therefore, the pipe section being added to the pipeline is usually rotated or shifted about its longitudinal axis to properly offset or stagger its weld seam with respect to the weld seam of the pipe to which it is to be welded. So far as is known, such rotation or shifting of the pipe has been heretofore accomplished by manually rolling the pipe on the ground or other support. Such manual rolling of the pipe is not only difficult due to the bulkiness and weight of the pipe, but it also subjects the coating to damage during the rolling.

Furthermore, during other phases of the pipeline laying operation, the pipe sections are rotated or shifted. For example, prior to applying the coating on the pipe, it is often necessary to rotate or shift the position of the pipe so as to locate the weld seam in the most advantageous position during the coating operation or during the bending of the pipe. It is generally desirable to locate the weld seam within the upper 120° portion of the pipe during the coating of the pipe because the tar, asphalt or other coating adheres to the seam better under such conditions. Also, during the bending of the pipe, the weld seam should be on a neutral axis of the pipe to avoid rupturing the weld seam and therefore, the weld seam should not be on the inside or the outside of the bend in the pipe. So far as is known, it has been the practice to manually shift or rotate the pipe sections under such conditions, which as previously pointed out, is extremely difficult due to the bulkiness and weight of the pipe.

It is therefore an object of this invention to provide a new and improved pipe tongs which is capable of rotating or shifting pipe.

Another important object of this invention is to provide new and improved pipe tongs which is capable of lifting pipe and/or rotating or turning same about its longitudinal axis.

A further object of this invention is to provide new and improved pipe tongs which is adapted to engage the external surface of pipe with a clamping action prior to imparting any lifting force to the pipe, whereby damage to the pipe, or any coating thereon, by the clamp during the lifting of the pipe is prevented.

Still another object of this invention is to provide new and improved pipe tongs which is capable of rotating a pipe about its longitudinal axis through a selected number of degrees to thereby accurately locate the weld seam of the pipe at any desired position to facilitate coating of the pipe, bending of the pipe, or other operations in connection with the pipe during the laying of a pipeline or under any other circumstances.

A still further object of this invention is to provide new and improved pipe tongs in which the clamping mechanism is locked or clamped to the pipe with the locking means under tension.

The preferred embodiment of this invention will be described hereinafter, together with other features thereof, and additional objects will become evident from such description.

The invention will be more readily understood from a reading of the following specification and by reference to the accompanying drawings forming a part thereof, wherein an example of the invention is shown, and wherein:

FIG. 1 is an elevation of the preferred form of the pipe tongs of this invention shown in position for imparting rotation and/or lifting of a pipe;

FIG. 2 is a plan view of the device shown in FIG. 1 taken on line 2—2 of FIG. 1 to illustrate further details of the invention; and FIG. 3 is a view, partly in elevation and partly in section, illustrating a portion of the pipe tongs of FIG. 1 after the pivoted shoe has been moved to a released position.

In the drawings, the letter A designates generally the pipe tongs of this invention which are adapted to be used for the rotation and/or lifting of a pipe P during the laying of a pipeline or any other operation. With the pipe tongs A of this invention, the pipe P may be rotated or shifted about its longitudinal axis for a selected number of degrees so as to locate the longitudinal weld seam W on the pipe P at any desired point, or the pipe P may be rotated for any other purpose. As will be more fully explained, such rotation or shifting of the pipe P is accomplished by applying a lifting force to the apparatus A of this invention. Also, it is important to note that the pipe tongs A of this invention are constructed so that they are adapted to grip or clamp the pipe P prior to applying the lifting force on the pipe tongs A, as will be explained more fully hereinafter. The pipe tongs A of this invention are therefore a relatively simple device which is capable of rotating and/or lifting a pipe, either or both of which can be accomplished without manually rolling the pipe P and without subjecting an external coating on the pipe P to damage.

Considering the invention more in detail, the pipe tongs A include arcuate body elements 10 and 11 which together form the arcuate body of the pipe tongs A of this invention. Such body elements 10 and 11 are normally formed of steel or a similar relatively high strength material. The body elements 10 and 11 are preferably parallel to each other, but are laterally spaced with respect to each other as best seen in FIG. 2. As shown in FIG. 1, the body elements 10 and 11 are substantially U shaped and the inner or lower edges 10a and 11a (FIGS. 1 and 3) are formed by a radius line which is longer than the radius of the pipe P upon which the pipe tongs A are to be used. It should be noted however that the curvature or other shape of the inner or lower edges 10a and 11a of the body elements 10 and 11, respectively, may be varied so long as the lower ends of the body elements 10 and 11 are spaced a sufficient distance apart to position the body elements 10 and 11 on the pipe P so as to thereafter clamp or grip the pipe P with the pipe tongs A as will be explained.

The pipe tongs A include a pair of circumferentially spaced pipe engaging shoes 12 and 14 which are preferably fixed to the body elements 10. Thus, the pipe engaging shoe 12 includes a plate 12a which is normally formed of steel or a similar metal which is welded or is otherwise secured to the lower or inner edges 10a and 11a of the body elements 10 and 11, respectively. The shoe 12 also has a lining 12b secured to the plate 12a, which lining is of a relatively soft material such as a woven fabric of the type used on brake shoe linings. Such liner 12b is bonded to the plate 12a with an adhesive or any other securing means and is sufficiently soft so that it does not damage the external coating of tar, asphalt or other similar material on the pipe P. It is to be noted that the plate 12a of the shoe 12 serves to connect the body elements 10 and 11.

The other shoe 14 also has a plate 14a of steel or similar material which is adapted to be welded or otherwise connected to the lower or inner edges 10a and 11a of the body elements 10 and 11, respectively, so as to serve in part as a means for connecting the body elements 10 and 11 together to rigidify same. The shoe 14 also has a liner 14b which is adhered to the plate 14a by adhesive or other securing means. Such liner 14b is made of the same material as the liner 12b for engaging the external surface of the pipe P without damaging any coating thereon, although it will be appreciated that the shoe liners 12b and 14b may be made of different materials in the particular pipe tongs A of this invention.

In addition to the pipe engaging shoes 12 and 14, the pipe tongs A of this invention have a pipe engaging shoe 16 which is mounted on the opposite ends of the body elements 10 and 11 from the pipe engaging shoe 12. The pipe engaging shoe 14 is thus located intermediate of the pipe engaging shoes 12 and 16. Such pipe engaging shoe 16 has a plate 16a which in the usual form of this invention corresponds in size and shape with the plates 12a and 14a of the shoes 12 and 14, respectively. Also, the shoe 16 includes a liner 16b which preferably is of one of the materials previously mentioned for use in connection with the liner 12b of the shoe 12. In any event, the liner 16b, like the liners 12b and 14b, is of a material which is sufficiently soft so that it will not damage the tar, asphalt or other coating on the external surface of the pipe P.

The plate 16a is welded to one or more brackets or pivot arms 20, two of which are shown in the drawings (FIG. 2). Suitable openings are provided in the brackets or pivot arms 20 which extend through bosses 20a and are aligned with suitable openings in the body elements 10 and 11 which extend through bosses 10c and 11c for receiving a pivot pin or rod 25 whereby the brackets or pivot arms 20 are mounted for pivotal movement with respect to the body elements 10 and 11. By reason of such pivotal movement of the brackets or pivot arms 20, the guide shoe 16 is adapted to be moved towards and away from the pipe P from a clamping position shown in FIG. 3, as will be more fully explained.

For accomplishing such movement of the shoe 16 and for locking the shoe 16 in gripping or clamping engagement with the pipe P, a connecting element or rod 30 is connected to the brackets 20 and to a locking member 35 which has a handle 36 therewith. The connecting element or rod 30 is preferably adjustable in length to accommodate the pipe tongs A of this invention to pipes of different diameters. To accomplish such adjustability, the connecting rod 30 includes a tube or sleeve 31 which is pivotally mounted on a pivot rod 22 which extends through suitable openings in bosses 20b of the brackets 20 so as to permit a pivotal movement of the sleeve 31. A threaded rod 32 is welded or is otherwise secured to the external surface of the tube 31 and is therefore capable of pivoting with the sleeve 31 about the pin 22. The rod 32 extends into an internally threaded sleeve 33 so that the end of the rod 32 terminates at a point somewhat below the mid-point of the tube 33. The external threads 32a on the rod 32 engage with corresponding threads on the interior of the sleeve 33. The threads on the interior of the sleeve 33 also engage with threads 34a on a rod 34 at the outer end of the tube 30. The threads 32a and 34a are in an opposite direction so that as the tube 33 is rotated in one direction, the rods 32 and 34 will move inwardly towards each other and upon a reversal of the direction of the tube 33, the rods 32 and 34 will move outwardly away from each other. It will therefore be evident that the action is in the nature of a turnbuckle and by rotation of the sleeve 33 in one direction, the connecting element or rod 30 is lengthened while a rotation of the sleeve 33 in the other direction will effect a shortening of the rod or element 30.

The upper end of the rod 34 and therefore the upper end of the connecting element 30 is welded or is otherwise secured to a sleeve or tube 37 which is pivotally mounted on a pivot pin or rod 38.

The locking member 35 includes spaced locking plates 39 and 40 which are joined by a lateral bar 41. The handle 36 is connected to the bar 41. The complete locking member 35 is mounted between the body elements 10 and 11 on stub pins or shafts 50 and 51 which extend through suitable aligned openings in the body elements 10 and 11 and other suitable openings in the plates 39 and 40. The openings in the body elements extend through bosses 10d and 11d, respectively, and the openings in the plates 39 and 40 extend through bosses 39a and 40a, respectively. It is important to note that such pins 50 and 51 do not extend into the area between the plates 39 and 40, so as to permit the connecting rod 30 to move between such pins 50 and 51 during the locking of the shoe 16 in engagement with the pipe P, as will be more evident hereinafter.

The pivot pin 38 which extends through the sleeve 37 is mounted in suitable openings through bosses 39b and 40b of the plates 39 and 40, respectively. It is to be noted that the upper end of the connecting element 30 is pivotally connected to the locking member 35 at a point inwardly of the pivot pins 50 and 51 and also the lower end of the connecting element 30 is connected to the brackets 20 at a point inwardly of the pivot pin 25 when the shoe 16 is in the released position (FIG. 3). By reason of such construction, the connecting element 30 is placed under tension when the shoe 16 is moved into the gripping or clamping position (FIG. 1). Since the weight of the pipe P being handled with the pipe tongs A of this invention may be extremely great and therefore substantial forces are involved on the parts of the tongs A, the construction of this invention which places the connecting element 30 under tension rather than under compression during the gripping or clamping of the pipe P is important due to the fact that the member 30 is capable of being subjected to greater forces under tension without failure.

For imparting a lifting force to the body of the pipe tongs A, a lift plate 60 is welded or is otherwose connected to the body elements 10 and 11. In the usual case, the lifting plate 60 is secured to the elements 10 and 11 at an intermediate point between the ends of such elements 10 and 11, and preferably at the mid-point between such ends as shown in FIG. 1 of the drawings. In the form of the invention shown in the drawings, the plate 60 extends outwardly or above the upper edges of the arcuate elements 10 and 11 and an eye or opening 60a is provided on such extension for receiving a hook H or any other similar means for imparting a lifting force to the pipe tongs A. It will be appreciated that if the pipe tongs A are positioned on the pipe P so that the lift plate 60 is substantially vertically above the longitudinal central axis of the pipe P, upon a raising of the hook H with a line L or any other suitable lifting means, a vertical lifting force will be imparted to the pipe tongs A and to the pipe P without actually rotating the pipe P about its longitudinal central axis. However, if the pipe tongs A are connected to the pipe P so as to position the lift plate 60 at an angle with respect to the vertical, one position of which is illustrated in FIG. 1, then upon a lifting of the line L, the lifting force imparted to the plate 60 will transmit a turning or rotational force to the pipe tongs A to thereby impart a rotational or turning movement to the pipe P about the longitudinal central axis of the pipe P. The particular position of the plate 60 with respect to vertical therefore determines the amount of rotation or turning of the pipe P since the turning of the pipe P will continue until the plate 60 has reached a position vertically above the longitudinal central axis of the pipe P.

In the operation or use of the pipe tongs A of this invention, the tongs A are positioned over the pipe P with the pivoted shoe 16 in the released position of FIG. 3. As previously pointed out, the particular position of the pipe tongs A on the pipe P will depend upon whether or not it is desired to impart a rotation or turning movement to the pipe P. If it is desired to rotate the pipe P, the pipe tongs A would be positioned on the pipe P with the lift plate 60 at an angle with respect to the vertical as shown in FIG. 1, but with the shoe 16 in the released position of FIG. 3. The pipe P would under such circumstances normally be located on the ground G or other suitable supports for subsequent positioning in a ditch D, a portion of which is illustrated in FIG. 1. In some instances, in order to get the maximum rotation of the pipe P in one movement of the pipe tongs A, a small portion of the ground may be removed or dug away as indicated at R to permit the body elements 10 to be positioned around the lower portion of the pipe P. However, it should be understood that it is not necessary to remove the ground to form a hole R if a smaller amount of rotation of the pipe P is satisfactory.

In any event, after the shoes 12 and 14 contact the external surface of the pipe P in circumferentially spaced engagement, the shoe 16 is then pivoted towards the pipe P into contact therewith by moving the handle 36 from its raised position shown in FIG. 3 to the lowered clamping position shown in FIG. 1. The shoe 16 is locked in such gripping or clamping position because the upper end of the connecting element 30 which is pivotally connected to the locking member 35 at the pin 38, passes from the left side of the pivot pins 50 ad 51 (FIG. 3) to the right side thereof (FIG. 1). The length of the connecting element 30 is adjusted as previously explained in order to permit the movement to such locking position shown in FIG. 1.

It is to be noted that the shoes 12 and 16 are positioned to one side of the longitudinal central axis of the pipe P while the intermediate shoe 14 is positioned to the other side of such longitudinal central axis. Thus, if a diameter line were drawn through a longitudinal central axis of the pipe P in FIG. 1 so as to position the ends thereof to the left of the shoes 12 and 16, the shoes 12 and 16 would thus be to the right of such diameter line and the shoe 14 would be to the left thereof. The shoes 12, 14 and 16 thus exert radial forces on the pipe P to prevent the pipe P from dropping from the shoes 12, 14 and 16 when they are in gripping engagement therewith.

If it is desired to merely rotate or shift the pipe P about its longitudinal central axis, the lifting force is imparted through the line L and the hook H or any other suitable means to the lift plate 60 in a sufficient amount to rotate the tongs R by the lifting force, but without imparting any actual lift to raise the pipe P off the ground. On the other hand, if it is desired to simultaneously lift and rotate the pipe P, such may be done by the same lifting action but generally with a greater amount of lifting force. It is important to also note that all of the gripping action on the pipe P by the shoes 12, 14 and 16 is obtained prior to imparting any lifting force to the tongs A and therefore damage to the pipe P or any coating thereon is prevented.

The particular number of degrees of rotation of the pipe P can be controlled therefore by the positioning of the lift plate 60, and as previously pointed out, if it is desired to merely lift the pipe P without rotating same, the lift plate 60 is positioned so that the lift plate 60 is substantially vertically above the longitudinal central axis of the pipe P. After the pipe has been lifted and/or rotated, the pipe tongs A is released from the pipe P by releasing the shoe 16 from its gripping contact with the pipe P. Such release is effected by swinging the handle 36 from the position shown in FIG. 1 to the raised position shown in FIG. 3, thus swinging the shoe 16 to the released position of FIG. 3. The shoe 16 and the shoe 12 are then spaced apart a greater distance than the diameter of the pipe P and the pipe tongs A may be readily removed from the pipe P or may be positioned at another angle for a subsequent rotation or shifting of the pipe P.

Therefore, with the pipe tongs A of this invention, the pipe P may be rotated any desired number of degrees to locate the weld W at any desired position. Likewise, the pipe P may be rotated or lifted for any other purpose without requiring manual rolling of the pipe P and without subjecting the external coating on the pipe P to damage from the tongs A.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. Pipe tongs comprising, an arcuate body having a pair of pipe engaging shoes mounted thereon for engaging a pipe at circumferentially spaced points on one side of the longitudinal central axis of the pipe, said body also having another pipe engaging shoe thereon at an intermediate point between said pair of pipe engaging shoes for engaging the pipe at a point on the other side of the longitudinal central axis of the pipe said pipe engaging means acting to rotate the engaged pipe about its longitudinal central axis as it is lifted, pivot means mounting one of said pair of pipe engaging shoes for pivotal movement with respect to said body for movement into and out of gripping engagement with the pipe, a lock member pivotally mounted on said body, a connecting element connecting said lock member to said pivot means, and means for pivoting said lock member for effecting a pivoting of said one of said pair of pipe engaging shoes into gripping engagement with the pipe and for locking same in such gripping engagement with said connecting element under tension by moving the end of said connecting element which is connected to said lock member from a position on one side of the pivot point for said lock member to a point on the other side thereof.

2. A pipe tongs comprising, an arcuate body, a pair of pipe engaging shoes mounted on said body for engaging a pipe at circumferentially spaced points on one side of a longitudinal central axis of the pipe, pivot means on said body for pivotally mounting one of said pair of pipe engaging shoes for pivotal movement with respect to said body for movement into and out of gripping engagement with the pipe, the other of said pair of pipe engaging shoes being substantially fixedly secured on said body, an intermediaite pipe engaging shoe substantially fixedly secured on said body at a point between said pair of pipe engaging shoes for engaging the pipe at a point on the other side of the longitudinal central axis of the pipe, a lock member pivotally mounted on said body, a connecting element connecting said lock member to said pivot means, means for pivoting said lock member for effecting a pivoting of said one of said pair of pipe engaging shoes into gripping engagement with the pipe and for locking same in such gripping engagement with said connectiing element under tension by moving the end of said connecting element which is connected to said lock member from a position on one side of the pivot point for said lock member to a point on the other side thereof.

3. A pipe tongs comprising, an arcuate body, a pair of pipe engaging shoes mounted on said body for engaging a pipe at circumferentially spaced points on one side of a longitudinal central axis of the pipe, pivot means on said body for pivotally mounting one of said pair of pipe engaging shoes for pivotal movement with respect to said body for movement into and out of gripping engagement with the pipe, the other of said pair of pipe engaging shoes being substantially fixedly secured on said body, an intermediate pipe engaging shoe substantially fixedly secured on said body at a point between said pair of pipe engaging shoes for engaging the pipe at a point on the other side of the longitudinal central axis of the pipe, a lock member pivotally mounted on said body, a connecting element connecting said lock member to said pivot means, means for pivoting said lock member for effecting a pivoting of said one of said pair of pipe engaging shoes into gripping engagement with the pipe and for locking same in such gripping engagement with said connecting element under tension by moving the end of said connecting element which is connected to said lock member from a position on one side of the pivot point for said lock member to a point on the other side thereof, and means on said body for enabling a force to be applied to said body to thereby rotate the pipe about its longitudinal axis.

References Cited in the file of this patent

UNITED STATES PATENTS

| | | |
|---|---|---|
| 1,952,605 | Pearson | Mar. 27, 1934 |
| 2,378,570 | Mitchell | June 19, 1945 |
| 2,520,815 | Shaboo | Aug. 29, 1950 |
| 2,597,760 | Strahm | May 20, 1952 |
| 2,655,401 | Kelso | Oct. 13, 1953 |
| 2,706,060 | Ferrario | Apr. 12, 1955 |
| 2,819,111 | Cozzens | Jan. 7, 1958 |
| 2,880,031 | Dark | Mar. 31, 1959 |
| 2,911,251 | Osborn | Nov. 3, 1959 |

FOREIGN PATENTS

| | | |
|---|---|---|
| 27,613 | Great Britain | of 1911 |